United States Patent
Tonetti et al.

(10) Patent No.: US 7,918,083 B2
(45) Date of Patent: Apr. 5, 2011

(54) METHOD OF CONTROLLING AIR INTAKE FLOW OF AN INTERNAL COMBUSTION ENGINE, IN PARTICULAR FOR REGENERATING A NITRIC OXIDE ADSORBER

(75) Inventors: Marco Tonetti, Orbassano (IT); Alberto Gioannini, Orbassano (IT); Francesco Bechis, Orbassano (IT)

(73) Assignee: C.F.R. Societa Consortile per Azioni, Orbassano (IT)

( * ) Notice: Subject to any disclaimer, the term of this patent is extended or adjusted under 35 U.S.C. 154(b) by 1450 days.

(21) Appl. No.: 11/355,057

(22) Filed: Feb. 16, 2006

(65) Prior Publication Data
US 2006/0248878 A1 Nov. 9, 2006

(30) Foreign Application Priority Data

May 3, 2005 (EP) .................................... 05425285

(51) Int. Cl.
*F01N 3/00* (2006.01)
(52) U.S. Cl. ................ 60/285; 60/274; 60/276; 60/278; 60/301
(58) Field of Classification Search .................... 60/274, 60/276, 285, 301
See application file for complete search history.

(56) References Cited

U.S. PATENT DOCUMENTS

| 6,796,118 B2 * | 9/2004 | Kitahara .......................... 60/285 |
| 7,159,391 B2 * | 1/2007 | Kogo et al. ...................... 60/297 |

FOREIGN PATENT DOCUMENTS

| DE | 19615547 A1 | 10/1997 |
| DE | 20108652 U1 | 9/2002 |
| EP | 0947685 A | 10/1999 |

OTHER PUBLICATIONS

European Search Report mailed Oct. 13, 2005 in corresponding PCT Application No. 05425285.3-2311.

* cited by examiner

*Primary Examiner* — Thomas E Denion
*Assistant Examiner* — Diem Tran
(74) *Attorney, Agent, or Firm* — Davidson Berquist Jackson & Gowdey, LLP

(57) ABSTRACT

There is described a method of controlling air intake flow of an internal combustion engine (1), the method including the steps of calculating a reference airflow ($A_{REF}$) as the sum of a feed-forward contribution ($A_{FF}$), calculated as a function of the reference air/fuel ratio ($(A/F)_{REF}$) to be obtained in the combustion chamber, and a feed-back contribution ($A_{FB}$), calculated as a function of the oxygen concentration (% $O_2$) of the exhaust gas; and closed-loop controlling the air intake flow of the engine so that it equals the reference airflow ($A_{REF}$).

22 Claims, 1 Drawing Sheet

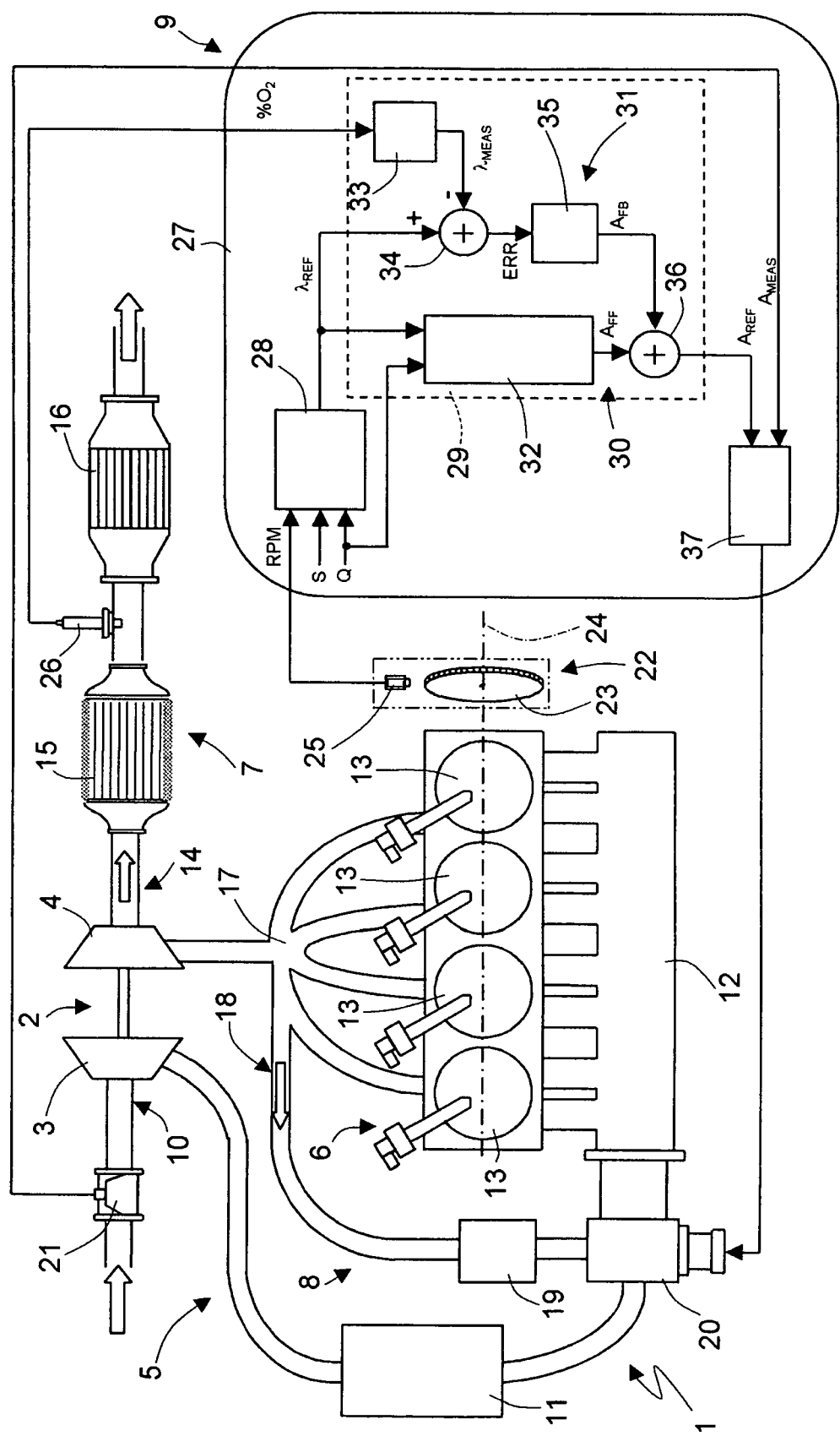

METHOD OF CONTROLLING AIR INTAKE FLOW OF AN INTERNAL COMBUSTION ENGINE, IN PARTICULAR FOR REGENERATING A NITRIC OXIDE ADSORBER

CROSS-REFERENCE TO RELATED APPLICATIONS

The present application claims priority to European Application Serial No. 05425285.3 filed May 3, 2005, the entire contents of which are herein incorporated by reference.

BACKGROUND OF THE INVENTION

The present invention relates to a method of controlling air intake flow of an internal combustion engine.

The present invention may be used to particular advantage, though not exclusively, for controlling an internal combustion engine exhaust gas post-treatment system, and in particular for regenerating a nitric oxide adsorber for treating diesel engine exhaust gas, to which the following description refers purely by way of example.

As is known, diesel engine emissions comprise the following compounds, some of which are harmful to health and/or the environment:

carbon dioxide ($CO_2$) and steam ($H_2O$), both produced by complete combustion of hydrocarbons in the fuel;
unburnt hydrocarbons (HC) and carbon monoxide (CO), both produced by incomplete combustion of hydrocarbons in the fuel;
nitric oxides ($NO_x$) produced by oxidation of nitrogen in the engine air intake; and
particulate, mainly produced by incomplete combustion of the injected fuel.

Carbon monoxide and hydrocarbons are convertible to carbon dioxide and steam by the following oxidation process, which is active when the air-fuel mixture is lean, i.e. high in oxygen:

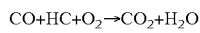

Nitric oxides, on the other hand, are convertible to carbon dioxide, nitrogen, and steam by the following reduction process, which is effective when the air-fuel mixture is rich:

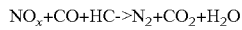

Otto engines can exploit the above phenomena simultaneously.

To effectively eliminate all three of the above pollutants (HC, CO, $NO_x$), the air-fuel mixture in the combustion chamber of Otto engines equipped with a trivalent catalyst must be stoichiometric, i.e. the amount of air fed into the combustion chamber must be the exact amount required to burn the fuel in the combustion chamber.

Trivalent catalysts, however, are unsuitable for use in diesel engines, operation of which calls for an air quantity in excess of stoichiometric proportions (lean operation), thus preventing reduction of nitric oxides in normal operating conditions, for the reasons stated above.

Nitric oxides produced by diesel engines, therefore, cannot be eliminated using a trivalent catalyst, and the effectiveness of a catalyst in this type of engine is limited solely to oxidizing carbon monoxide and hydrocarbons into carbon dioxide and steam.

To reduce nitric oxide emissions, a fraction of the exhaust gas is known to be recirculated into the combustion chamber ("EGR—Exhaust Gas Recirculation"). Exhaust gas comprises carbon dioxide, which, having a high thermal capacity capable of reducing the temperature in the chamber for a given heat produced by combustion, reduces heat exchange between the hot regions of the chamber, where nitric oxides are more easily formed, so that the overall effect is a reduction in the total amount of nitric oxides produced by combustion. The amount of exhaust gas fed back into the combustion chamber is normally regulated by a so-called EGR solenoid valve located along a recirculating line connecting the exhaust gas pipe to the intake pipe of the engine.

Used alone, however, exhaust gas recirculation fails to meet the requirements of more recent pollution regulations, particularly in terms of particulate and unburnt hydrocarbon production.

One recently adopted solution capable of effectively reducing nitric oxide emission is the use of a so-called nitric oxide adsorber ("NOx adsorber"), also known as a nitric oxide trap (LNT—"Lean NOx Trap"), which is fitted along the exhaust pipe, downstream from a conventional catalyst, and in which nitrogen monoxide (NO) is converted to nitrogen dioxide ($NO_2$) by an oxidizing element, e.g. platinum (Pt), and then trapped in an adsorbent compound, e.g. barium oxide (BaO).

During the adsorption process, the barium oxide ultimately becomes unable to store nitrogen monoxide (NO), on account of saturation of the acceptor sites; and, when the nitric oxide adsorber reaches a saturation level at which nitric oxides are no longer eliminated effectively, the acceptor sites must be "cleared" periodically by so-called regeneration, i.e. desorption and simultaneous reduction of nitric oxides. At this stage, the barium oxide (BaO) is separated into nitrogen and carbon dioxide by a reducing element, e.g. rhodium (Rh), which is achieved by calibrating the diesel engine to produce a reducing environment (rich operation) in the exhaust gas for a few seconds.

Another factor which reduces the adsorption capacity of barium is the presence of sulphur in the fuel. Unfortunately, over 300° C., sulphur oxidizes to sulphur dioxide ($SO_2$) which in turn may be converted by ambient humidity to sulphur trioxide ($SO_3$). Both these compounds react with barium oxide in the same way as nitrogen dioxide, i.e. tend to become trapped in the barium acceptor sites in the form of barium sulphate ($BaSO_4$), so that some of the acceptor sites are permanently occupied by barium sulphate, thus preventing retention of part of the nitrogen dioxide and so impairing efficiency of the adsorber. In fact, unlike regeneration of acceptor sites saturated with nitrogen dioxide, which takes place between 300 and 450° C., temperatures of around 600° C. are required to regenerate sulphate-saturated acceptor sites.

To prevent sulphates damaging the nitric oxide adsorber, the fuel must therefore contain no sulphur or, to limit the extent of damage, must contain at most 10 ppm.

Though slow, sulphate accumulation in the adsorber is therefore inevitable, on account of small quantities being derived anyway from the lubricating oil as well as the fuel, and must be removed periodically, every 1000-4000 km, by a specific regeneration strategy, known as desulphatization, combining reducing environment conditions and temperature levels of around 600° C.

Adsorption, desorption, and desulphatization are closely related to the composition of the air-fuel mixture during operation of the engine. That is, to adsorb nitric oxides and sulphur, the air-fuel mixture must be lean (oxidizing environment), whereas, to desorb nitric oxides or desulphatize sulphur oxides, the air-fuel mixture must be rich (reducing environment).

More specifically, the nitric oxide adsorption and reduction mechanism commences, in lean air-fuel mixture conditions, with oxidation of nitrogen monoxide (NO) to nitrogen dioxide ($NO_2$) by the platinum (Pt) acting as a catalyst, according to the equation:

$$NO + \tfrac{1}{2} O_2 \rightarrow NO_2$$

Subsequently, the nitrogen dioxide ($NO_2$) reacts with the adsorbent element—barium oxide (BaO)—by which it is trapped (i.e. chemically sorbed) in the form of barium nitrate ($Ba(NO_3)_2$), according to the equation:

$$BaO + NO_2 + \tfrac{1}{2} \rightarrow Ba(NO_3)_2$$

At the regeneration stage, the air-fuel mixture is enriched for a predetermined time period to increase carbon monoxide and unburnt hydrocarbon emissions and impart reducing properties to the exhaust gas.

The reducing atmosphere produces thermodynamic instability in the barium nitrate, which thus releases nitrogen monoxide (NO) and nitrogen dioxide ($NO_2$), according to the equations:

$$Ba(NO_3)_2 \rightarrow BaO + 2NO + \tfrac{1}{2} O_2$$

$$Ba(NO_3)_2 \rightarrow BaO + 2NO_2 + \tfrac{1}{2} O_2$$

In rich air-fuel mixture conditions, and thanks to the presence of rhodium as a catalyst, nitrogen monoxide (NO) and nitrogen dioxide ($NO_2$) are reduced by carbon monoxide (CO), hydrogen and hydrocarbons to nitrogen ($N_2$) and carbon dioxide ($CO_2$).

One possible reduction path is the equation:

$$NO + CO \rightarrow \tfrac{1}{2} N_2 + CO_2$$

The air-fuel mixture is commonly defined quantitatively by the air/fuel (A/F) ratio or strength in the engine combustion chambers, which ratio indicates the amount of fresh air available for the combustion process.

Regeneration strategies currently comprise a fixed-duration (roughly 5-second) regeneration step, during which the air-fuel mixture is enriched—in particular, assumes an air/fuel (A/F) ratio value of between 12 and 14—and which is preceded by a fixed-duration (roughly 60-second) accumulation step, during which the air-fuel mixture is poor—in particular, assumes an air/fuel (A/F) ratio value of between 20 and 55.

One known method of modifying the air/fuel ratio in exhaust-gas-recirculation engines, to switch from the accumulation to the regeneration step, is to adjust the recirculated exhaust gas fraction, thus varying the amount of oxygen fed into the combustion chamber. European Patent Application EP-A-1 336 745 proposes a recirculated exhaust gas fraction control system, in which the EGR valve is closed-loop controlled so that engine air intake flow equals a reference airflow calculated on the basis of a desired reference air/fuel ratio in the engine combustion chamber.

The above closed-loop system of controlling air intake flow, however, is not very effective when regenerating the nitric oxide adsorber. That is, being of very short duration and depending greatly on the air-fuel ratio, regeneration of the nitric oxide adsorber calls for extremely precise, fast variation of the air/fuel ratio, which known control systems fail to achieve.

It is an object of the present invention to provide a method and device for controlling air intake flow of an internal combustion engine, in particular for regenerating a nitric oxide adsorber.

According to the present invention, there are provided a method and device for controlling air intake flow of an internal combustion engine, as claimed in claims 1 and 17 respectively.

According to the present invention, there are also provided a method and device for controlling an internal combustion engine exhaust gas post-treatment system, as claimed in claims 15 and 18 respectively.

BRIEF DESCRIPTION OF THE DRAWING

A preferred, non-limiting embodiment of the present invention will be described by way of example with reference to the accompanying drawing, which shows, schematically, a diesel engine featuring an electronic control system implementing the air intake flow control method according to the present invention.

DETAILED DESCRIPTION OF THE INVENTION

Number 1 in the accompanying drawing indicates as a whole a diesel engine, in particular a supercharged diesel engine comprising a turbosupercharger 2 defined by a compressor 3 and by a turbine 4 connected to compressor 3; an air intake system 5; a common rail fuel injection system 6; an exhaust system 7; an exhaust gas recirculating system 8; and an electronic control system 9 for controlling the above systems.

More specifically, air intake system 5 comprises an air intake pipe 10, along which compressor 3 and a relative heat exchanger ("intercooler") 11 are located in series; and an air intake manifold 12 connected between air intake pipe 10 and the cylinders 13 of engine 1 to supply the intake air to the cylinders.

Exhaust system 7 comprises an exhaust pipe 14, along which are located in series turbine 4, an oxidizing catalytic converter 15, a nitric oxide adsorber 16, and a particulate filter (not shown); and an exhaust manifold 17 connected between cylinders 13 of engine 1 and exhaust pipe 14 to feed the gases produced by combustion in cylinders 13 to the exhaust pipe.

Exhaust gas recirculating system 8 comprises a gas recirculating pipe 18 connected between exhaust pipe 14, at a point upstream from turbine 4, and air intake pipe 10, at a point downstream from heat exchanger 11, and along which are located an additional heat exchanger (EGR cooler) 19, and a regulating solenoid valve, hereinafter referred to simply as EGR valve 20, located at the point at which gas recirculating pipe 18 is connected to air intake pipe 10.

Electronic control system 9 comprises an airflow meter 21 defined by a debimeter and located along air intake pipe 10, at a point upstream from compressor 3, to measure the air intake flow $A_{MEAS}$ of the engine; an engine speed measuring device 22 comprising a pulse wheel 23 fitted to the drive shaft 24 (shown schematically by a dot-and-dash line), and an electromagnetic sensor 25 facing pulse wheel 23 and generating a signal indicating the rotation speed of pulse wheel 23 and, therefore, engine speed RPM; an oxygen concentration sensor 26, known as a UHEGO ("Universal Heated Exhaust Gas Oxygen Sensor"), located along exhaust pipe 14, upstream from nitric oxide adsorber 16, to measure the oxygen concentration % $O_2$ in the exhaust gas; and an electronic central control unit 27 connected to airflow meter 21, to engine speed measuring device 22, and to EGR valve 20, and implementing the method of controlling air intake flow of engine 1, as described below.

Electronic central control unit 27 implements a selection block 28, which receives speed RPM, the engine load (defined by the amount of fuel Q injected into each cylinder), and a selection signal S for selecting the type of regeneration required (desorption or desulphatization) and generated by electronic central control unit 27 on the basis of a strategy not described in detail by not forming part of the present invention; and selection block 28 in turn supplies a reference lambda $\lambda_{REF}$, defined as the reference air/fuel ratio $(A/F)_{REF}$ to be obtained in the combustion chamber during desorption or desulphatization, normalized with respect to the stoichiometric air/fuel ratio $(A/F)_{STOICH}$, e.g. 14.65 for diesel fuel, i.e.:

$$\lambda_{REF} = (A/F)_{REF}/(A/F)_{STOICH}$$

More specifically, selection block 28 stores two tables (not shown), one each for desorption and desulphatization, which are addressed by selection signal S, and each of which contains the respective reference lambdas $\lambda_{REF}$ as a function of speed RPM and engine load Q.

Electronic central control unit 27 also implements an airflow computing block 29, which receives reference lambda $\lambda_{REF}$, injected fuel quantity Q, and exhaust gas oxygen concentration % $O_2$, and supplies a reference airflow $A_{REF}$ as described below.

More specifically, airflow computing block 29 comprises a feed-forward computing branch 30 supplying a feed-forward contribution $A_{FF}$ to reference airflow $A_{REF}$; and a feed-back computing branch 31 supplying a feed-back contribution $A_{FB}$ to reference airflow $A_{REF}$.

More specifically, feed-forward computing branch 30 is defined by a computing block 32, which receives reference lambda $\lambda_{REF}$ and injected fuel quantity Q, and supplies feed-forward contribution $A_{FF}$ to reference airflow $A_{REF}$ as a function of reference lambda $\lambda_{REF}$ and injected fuel quantity Q and according to a known equation.

Feed-back computing branch 31 comprises a conversion block 33, which receives exhaust gas oxygen concentration % $O_2$, and supplies a corresponding measured lambda $\lambda_{MEAS}$ calculated according to the following known equation:

$$\lambda_{MEAS} = \frac{\dfrac{\frac{H}{C}}{4 + \frac{H}{C}} \cdot X_{O2} + 1}{1 - \frac{100}{21} \cdot X_{O2}}$$

where H/C is the hydrogen to carbon ratio supplied by the Lambda sensor supplier, and $X_{O2}$ is the oxygen molar fraction measured by oxygen concentration sensor 26 and substantially represented by oxygen concentration % $O_2$.

Feed-back computing branch 31 also comprises a subtracting block 34, which receives reference lambda $\lambda_{REF}$ and measured lambda $\lambda_{MEAS}$, and supplies an error signal ERR equal to the difference between reference lambda $\lambda_{REF}$ and measured lambda $\lambda_{MEAS}$; and a computing block 35 implementing a known PID (Proportional Integral Derivative) structure not described in detail, and which receives error signal ERR and supplies feed-back contribution $A_{FB}$ to reference airflow $A_{REF}$.

Airflow computing block 29 comprises an adding block 36, which receives feed-forward contribution $A_{FF}$ and feed-back contribution $A_{FB}$, and supplies reference airflow $A_{REF}$ as the sum of feed-forward contribution $A_{FF}$ and feed-back contribution $A_{FB}$.

Finally, electronic central control unit 27 implements a control block 37 for closed-loop controlling EGR valve 20, and which receives reference airflow $A_{REF}$ and measured airflow $A_{MEAS}$, and supplies—in known manner not described in detail, by not forming part of the present invention—a control signal for controlling EGR valve 20 so that measured airflow $A_{MEAS}$ substantially equals reference airflow $A_{REF}$.

Unlike known control systems, in which air intake flow $A_{MEAS}$ by engine 1 is closed-loop controlled to make it equal a reference airflow $A_{REF}$ defined solely by feed-forward contribution $A_{FF}$, reference airflow $A_{REF}$ according to the present invention therefore also comprises a feed-back contribution $A_{FB}$ generated on the basis of exhaust gas oxygen concentration % $O_2$, so that the air/fuel ratio can be varied with the precision and speed necessary to regenerate the nitric oxide adsorber. That is, feed-forward computing branch 30 ensures high-speed variation of the air/fuel ratio when switching from the accumulation to the regeneration step, while feed-back computing branch 31 ensures a highly precise air/fuel ratio at the regeneration step.

Another advantage lies in the fact that, in addition to regenerating (desorbing or desulphatizing) nitric oxide adsorber 16, the control method according to the invention may also be used in any application involving fine adjustment of the air intake of engine 1 on the basis of the exhaust lambda.

The method also provides for compensating for drift in the mechanical and/or electronic characteristics of the component parts of common rail fuel injection system 6 and air intake system 5.

Clearly, changes may be made to the method as described and illustrated herein without, however, departing from the scope defined in the accompanying Claims.

For example, computing block 35 may calculate feed-back contribution $A_{FB}$ implementing a structure other than the one described, e.g. a PI structure or a model-based structure.

Moreover, reference airflow $A_{REF}$ may be calculated as a function of feed-forward contribution $A_{FF}$ and feed-back contribution $A_{FB}$ otherwise than as described, e.g. by adding them in weighted manner, or by generating a feed-back contribution $A_{FB}$ of 0 to 1 and using it as a multiplication factor of feed-forward contribution $A_{FF}$.

The invention claimed is:

1. A method of controlling air intake flow of an internal combustion engine, comprising:
   controlling the air intake flow of the engine as a function of a reference air/fuel ratio $((A/F)_{REF})$ to be obtained in the combustion chamber;
   controlling the air intake flow of the engine also as a function of the oxygen concentration (% O2) of the exhaust gas produced by the engine;
   calculating a reference airflow $(A_{REF})$ as a function of the reference air/fuel ratio $((A/F)_{REF})$ and the oxygen concentration (% O2) of the exhaust gas;
   controlling the air intake flow of the engine as a function of the reference airflow $(A_{REF})$;
   wherein calculating the reference airflow $(A_{REF})$ comprises:
   calculating a feed-forward contribution $(A_{FF})$ to the reference airflow $(A_{REF})$ as a function of the reference air/fuel ratio $((A/F)_{REF})$;
   calculating a feed-back contribution $(A_{FB})$ to the reference airflow $(A_{REF})$ as a function of the oxygen concentration (% $O_2$) of the exhaust gas;
   calculating the reference airflow $(A_{REF})$ as a function of said feed-forward contribution $(A_{FF})$ and said feed-back contribution $(A_{FB})$; and
   adding said feed-forward contribution $(A_{FF})$ and said feed-back contribution $(A_{FB})$.

2. The method as claimed in claim 1, wherein the air intake flow of the engine is closed-loop controlled as a function of the reference air/fuel ratio $((A/F)_{REF})$.

3. The method as claimed in claim 1, wherein controlling the air intake flow of the engine as a function of the reference air/fuel ratio $((A/F)_{REF})$ comprises:
   controlling exhaust gas recirculation in said engine.

4. The method as claimed in claim 1, wherein calculating a feed-back contribution $(A_{FB})$ comprises:
   determining a current air/fuel ratio $(\lambda_{MEAS})$ as a function of the oxygen concentration (% $O_2$) of the exhaust gas;
   calculating an error (ERR) as a function of the reference air/fuel ratio $((A/F)_{REF})$ and the current air/fuel ratio $(\lambda_{MEAS})$; and
   calculating said feed-back contribution $(A_{FB})$ as a function of said error (ERR), so as to zero said error (ERR).

5. The method as claimed in claim 4, wherein calculating the reference airflow $(A_{REF})$ comprises:
   adding said feed-forward contribution $(A_{FF})$ and said feed-back contribution $(A_{FB})$.

6. The method as claimed in claim 4, wherein calculating an error comprises:
   subtracting said current air/fuel ratio $(\lambda_{MEAS})$ and said reference air/fuel ratio $((A/F)_{REF})$.

7. The method as claimed in claim 6, wherein calculating the reference airflow $(A_{REF})$ comprises:
   adding said feed-forward contribution $(A_{FF})$ and said feed-back contribution $(A_{FB})$.

8. The method as claimed in claim 4, wherein said feed-back contribution $(A_{FB})$ is calculated, as a function of a factor proportional to said error (ERR), implementing a proportional-integral-derivative (PID) structure.

9. The method as claimed in claim 8, wherein calculating the reference airflow $(A_{REF})$ comprises:
   adding said feed-forward contribution $(A_{FF})$ and said feed-back contribution $(A_{FB})$.

10. The method as claimed in claims 8, wherein calculating an error comprises:
    subtracting said current air/fuel ratio $(\lambda_{MEAS})$ and said reference air/fuel ratio $((A/F)_{REF})$.

11. The method as claimed in claim 10, wherein calculating the reference airflow $(A_{REF})$ comprises:
    adding said feed-forward-contribution $(A_{FF})$ and said feed-back contribution $(A_{FB})$.

12. The method as claimed in claim 1, wherein the intake air flow is controlled to provide an exhaust gas post treatment system.

13. The method as claimed in claim 12, including the additional step of creating a rich air/fuel mixture to promote desorbing nitric oxides from a nitric oxide absorber.

14. The method as in claim 12, including the additional step of creating a rich air/fuel mixture to promote desulphatizing sulphur oxides in a nitric oxide absorber.

15. The method as in claim 12, including the additional step of creating a lean air/fuel mixture to promote nitric oxide absorption in a nitric oxide absorber.

16. A control device configured to control current intake airflow $(A_{MEAS})$ in an internal combustion engine by:
    computing a reference air/fuel ratio $((A/F)_{REF})$ to be obtained in an engine combustion chamber;
    measuring oxygen concentration (% $O_2$) in engine exhaust gas;
    computing a reference intake airflow $(A_{REF})$ based on the reference air/fuel ratio $((A/F)_{REF})$ and the oxygen concentration (% $O_2$); and
    controlling the current intake airflow $(A_{MEAS})$ based on the reference intake airflow $(A_{REF})$;
    wherein computing the reference airflow $(A_{REF})$ includes:
        computing a feed-forward contribution $(A_{FF})$ to the reference intake airflow $(A_{REF})$ based on the reference air/fuel ratio $((A/F)_{REF})$;
        computing a feed-back contribution $(A_{FB})$ to the reference intake airflow $(A_{REF})$ based on the oxygen concentration (% $O_2$); and
        computing the reference intake airflow $(A_{REF})$ based on the feed-forward contribution $(A_{FF})$ and the feed-back contribution $(A_{FB})$; and
    wherein computing the feed-back contribution $(A_{FB})$ comprises:
        computing a current air/fuel ratio $(\lambda_{MEAS})$ based on the oxygen concentration (% $O_2$); and
        computing the feed-back contribution $(A_{FB})$ based on the reference air/fuel ration $((A/F)_{REF})$ and the current air/fuel ratio $(\lambda_{MEAS})$.

17. The control device of claim 16, wherein computing the feed-back contribution $(A_{FB})$ further includes:
    computing an error (ERR) based on the reference air/fuel ratio $((A/F)_{REF})$ and the current air/fuel ratio $(\lambda_{MEAS})$;
    computing the feed-back contribution $(A_{FB})$ based on the error (ERR), so as to zero the error (ERR); and
    implementing either a proportional-integral-derivative (PID) structure, or a proportional-integral (PI) structure, or a model-based structure.

18. The control device of claim 17, wherein computing the error (ERR) based on the reference air/fuel ration $((A/F)_{REF})$ and the current air/fuel ratio $(\lambda_{MEAS})$ includes:
    subtracting the reference air/fuel ratio $((A/F)_{REF})$ and the current air/fuel ratio $(\lambda_{MEAS})$.

19. The control device as in claim 16, wherein computing the reference intake airflow $(A_{REF})$ based on the feed-forward contribution $(A_{FF})$ and the feed-back contribution $(A_{FB})$ includes:
    adding the feed-forward contribution $(A_{FF})$ and the feed-back contribution $(A_{FB})$.

20. The control device as in claim 16, wherein controlling the current intake airflow $(A_{MEAS})$ based on the reference intake airflow $(A_{REF})$ includes:
    measuring the current intake airflow $(A_{MEAS})$; and
    closed-loop controlling the current intake airflow $(A_{MEAS})$ so that the current intake airflow $(A_{MEAS})$ substantially equals the reference intake airflow $(A_{REF})$.

21. The control device as in claim 16, wherein controlling the current intake airflow $(A_{MEAS})$ includes:
    controlling exhaust gas recirculation in the engine.

22. The control device as in claim 16, further including an exhaust gas post treatment system including a nitric oxide absorber wherein the control over the intake air establishes either a lean air/fuel mixture promoting absorption of nitric oxide from within exhaust gas or a rich air/fuel mixture to promote desorbing of nitric oxides or desulphatizing sulfur oxide from within the nitric oxide absorber.

* * * * *

UNITED STATES PATENT AND TRADEMARK OFFICE
CERTIFICATE OF CORRECTION

| | | |
|---|---|---|
| PATENT NO. | : 7,918,083 B2 | Page 1 of 1 |
| APPLICATION NO. | : 11/355057 | |
| DATED | : April 5, 2011 | |
| INVENTOR(S) | : Marco Tonetti, Alberto Gioannini and Francesco Bechis | |

It is certified that error appears in the above-identified patent and that said Letters Patent is hereby corrected as shown below:

Title Page, Item (73) "C.F.R. Societa Consortile per Azioni" to be corrected to
"C.R.F. Societa Consortile per Azioni."

Signed and Sealed this
Twenty-third Day of August, 2011

David J. Kappos
*Director of the United States Patent and Trademark Office*